United States Patent [19]
Tikhonov et al.

[11] 3,757,948
[45] Sept. 11, 1973

[54] FILTER SEPARATOR FOR WET ENRICHMENT OF FINELY DISPERSED MATERIALS

[76] Inventors: Sergei Alexeevich Tikhonov, prospekt Kirova, 28, kv. 61; Gennady Georgievich Judin, prospekt Kirova, 28, kv. 1; Ninel Alexandrovna Babushkina, ulitsa Gagarina, 26, kv. 24, all of Simferopol, U.S.S.R.

[22] Filed: Mar. 29, 1971

[21] Appl. No.: 128,855

[52] U.S. Cl.................. 210/102, 210/223, 210/334
[51] Int. Cl....................... B01d 25/30, B01d 35/06
[58] Field of Search.................... 210/273, 334, 223; 209/212, 213, 224

[56] References Cited
UNITED STATES PATENTS

| | | | |
|---|---|---|---|
| 3,567,026 | 3/1971 | Kolm | 210/222 |
| 3,539,509 | 11/1970 | Heitman et al. | 210/42 |
| 2,943,739 | 7/1960 | Maynard | 210/223 |
| 2,385,431 | 9/1945 | Vose | 210/223 |
| 3,542,674 | 11/1970 | Machlan | 210/42 |

*Primary Examiner*—Samih N. Zaharna
*Assistant Examiner*—T. A. Granger
*Attorney*—Waters, Roditi, Schwartz & Nissen

[57] ABSTRACT

A filter separator for wet enrichment of finely dispersed materials comprising at least two filtering tanks made from non-magnetic material with ferromagnetic filtering elements accommodated therein and adapted for extracting desired materials from the pulp. Mounted in each tank between the filtering elements are electromagnetic coils, and provision is made for a distributor unit for separate supply of pulp and water to each of the tanks, this unit being installed above the tanks with capability of turning about their axis of symmetry.

8 Claims, 3 Drawing Figures

3,757,948

FILTER SEPARATOR FOR WET ENRICHMENT OF FINELY DISPERSED MATERIALS

The present invention relates to apparatus for wet enrichment of finely dispersed materials, employed in the enrichment of kaolins, feldspars and other minerals.

Known in the art is a filter separator designed for wet enrichment of oxidized iron ores, comprising a ring-type rotor divided by means of transverse partitions into filtering tanks accommodating ferromagnetic elements, namely, steel balls. The bottom of each filtering tank is made as a truncated pyramid provided with a drain for pulp and water.

The rotor rotates between the gaps of a magnetic circuit in an electromagnetic system. In the course of the rotor rotation, water and pulp are in turn fed to its tanks in an incessant flow passing through said tanks.

The pulp is fed when the tanks are between the gaps of magnetic circuit in the electromagnetic system, and water is fed when the tanks are outside said gaps.

When the filtering tank is in the magnetic circuit gap of the electromagnetic system, there takes place magnetization of the ferromagnetic elements in the tank, which elements extract from the pulp passing through the tank magnetized particles of iron-containing minerals.

The processsed pulp is drained to a receptacle.

When the filtering tank moves out of the magnetic circuit gap of the electromagnetic system, the ferromagnetic elements and particles of iron-containing minerals are demagnetized, while water supplied to the tank in an incessant flow carries away the extracted particles of iron-containing minerals and is then directed to special receivers.

The separation of the initial material in the flow, in the known filter separator, does not provide for a full extraction from the pulp of low susceptibility particles due to a high velocity of the pulp flow through the filtering tank, thereby precluding the possibility of separating materials which contain such minerals.

In the known filter separator, when separating initial materials, no use is made of the forces of selective adherence of hydrophobic particles of minerals being extracted to hydrophobic surfaces of the filtering elements, this likewise decreasing the efficiency of separation of finely dispersed materials.

The use in the filter separator of an electromagnetic system with magnetic circuit brings about dissipation of magnetic energy and is not conducive to a full utilization of this energy, this fact also producing an adverse effect upon the separation of the initial pulp.

A cumbersome electromagnetic system employed in the known filter separator causes a considerable increase in overall dimensions and cost of the latter.

It is an object of the present invention to develop a filter separator that provides for a fuller extraction from the initial material of particles of desired minerals.

It is another object of the invention to reduce the overall dimensions and weight, as well as cost, of the filter separator.

Disclosure is made of a filter separator for wet enrichment of finely dispersed materials, comprising at least two filtering tanks manufactured from non-magnetic material, in one of which tanks the desired minerals are extracted from pulp while in the other tank the extracted minerals are washed away by water, and electromagnetic coils adapted for magnetization of ferromagnetic filtering elements housed by said tanks. According to the invention, in each of the filtering tanks the electromagnetic coils are mounted between the ferromagnetic elements, while above the tanks there is mounted, with possibility of turning about their vertical axis of symmetry, a distributor unit adapted for effecting in turn the separate supply of pulp and water to each of the tanks.

In the filter separator according to the present invention, each filtering tank is made in the form of two concentric cylinders having therebetween a space for collecting the processed pulp, and a cone-shaped bottom having in its vertex an opening which accommodates a magnet valve adapted for the removal of water with extracted minerals, while in the upper portion of the outer cylinder provision is made for an opening adapted for draining the processed pulp.

In the filter separator of the present invention, the distributor unit is essentially a rotary bowl divided by means of a concentric partition into two sections for pulp and water, respectively, and two stationary receiving funnels arranged beneath the bowl, the bottom of each of the bowl sections having, diametrically opposite each other, an opening adapted for draining the pulp and water into the funnels which, on the rotation of the bowl, directs the pulp and water supplied thereto to the filtering tanks.

Used as the ferromagnetic filtering elements are steel balls or corrugated steel plates coated with a hydrophobic film.

When separating the initial material in the filter separator disclosed herein, low susceptibility particles are better retained by the ferromagnetic elements owing to the fact that the separation of the initial material takes place in bulk under conditions of laminar flow. This extends the possibilities of concentration of minerals enriched by means of the filter separator of the invention.

Coating the ferromagnetic filtering elements with a hydrophobic film helps make use, when separating the initial materials, of the force of selective adherence of hydrophobic particles of minerals being extracted of hydrophobic surfaces of the filtering elements, thereby also increasing the efficiency of separation of the initial materials.

The provision of electromagnetic coils in each of the filtering tanks between the ferromagnetic elements helps reduce dissipation of magnetic energy making for a better utilization thereof, thereby improving the process of separation of initial materials.

The absence of a magnetic circuit in the filter separator of the invention makes for reduced overall dimensions and weight, as well as cost, of the filter separator.

This invention will become more apparent upon considering the following detailed description of the preferred embodiment thereof, due reference being had to the accompanying drawing, in which.

Figure 1:
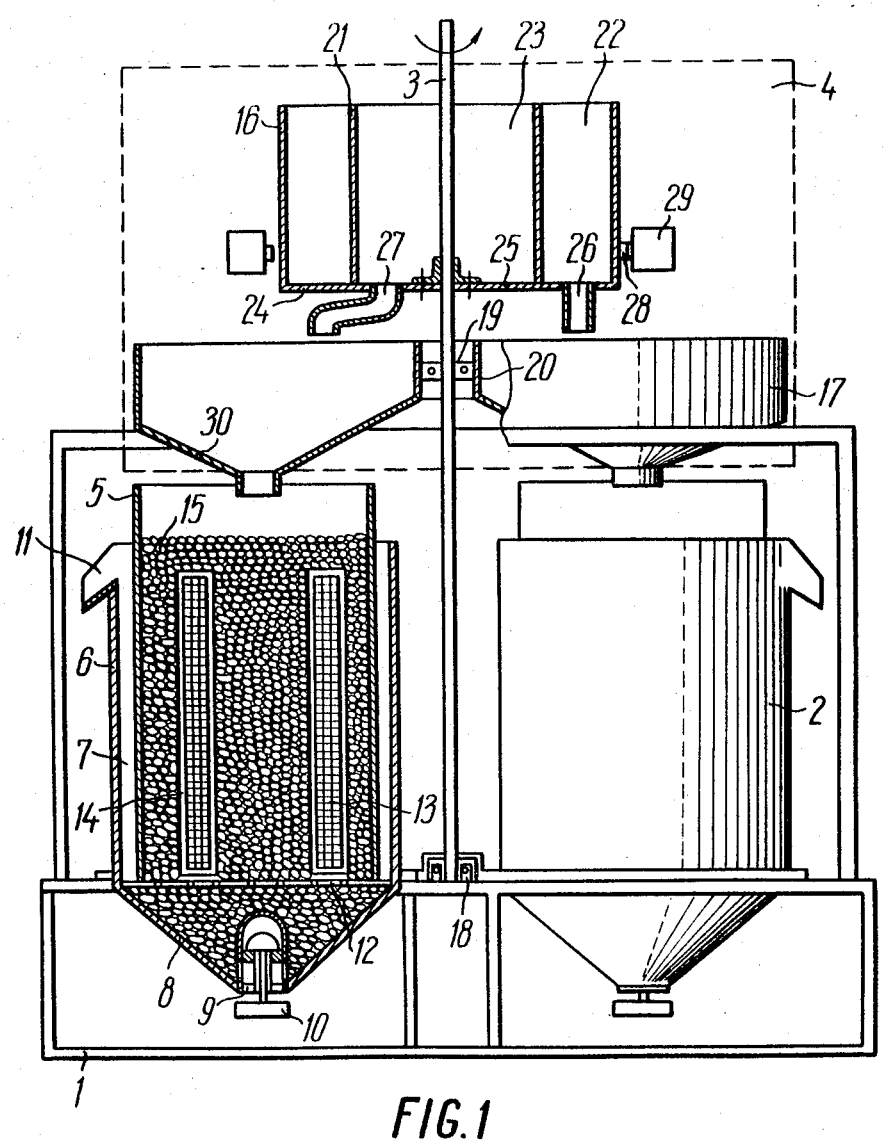
FIG. 1 illustrates partly in section a filter separator for wet enrichment of finely dispersed materials, in accordance with the present invention.
Figure 2:
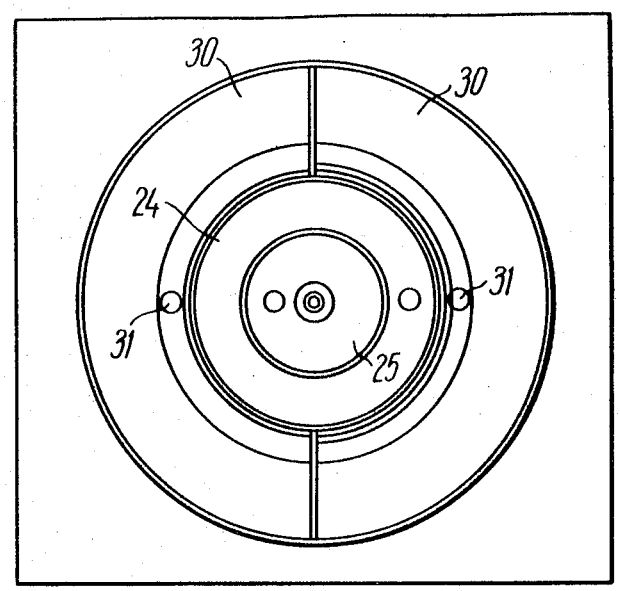
FIG. 2 is a plan view of the filter separator according to the invention.

Referring now to FIGS. 1 and 2 of the drawings, the filter separator of the present invention comprises a bedplate 1 made of plate steel, which mounts two filtering tanks 2 secured thereon symmetrically and rigidly.

Mounted on a shaft 3 above the tanks 2 with the possibility of turning about the vertical axis of symmetry of said tanks (which coincides with the shaft 3) is a distributor unit 4 adapted for effecting, in turn, separate supply of pulp and water to each filtering tank 2.

Each filtering tank 2 is manufactured from nonmagnetic material in the form of two concentric cylinders, namely, an inner cylinder 5 and an outer cylinder 6, between which there is provided a space 7 adapted for collecting the processed pulp. The bottom 8 of the tank 2 is connected with the outer cylinder 6 and has a conical shape with an opening 9 in its vertex.

The opening 9 of the bottom 8 accommodates a magnet valve 10 adapted for the removal of water with particles of extracted minerals. In the upper portion of the outer cylinder 6 provision is made for an opening 11 adapted for draining the processed pulp.

Provided inside the filtering tank 2 is a grid 12 which mounts the inner cylinder 5 and an electromagnetic coil 13 enclosed in a sealed casing 14 of non-magnetic material. The coil is arranged between hydrophobic ferromagnetic elements 15, preferably, steel balls or corrugated steel plates coated with a thin film (3 $\mu$ to 5 $\mu$) of a hydrophobic substance, for example, organo-silicon waterproofing fluid, Teflon, etc.

The distributor unit 4 comprises a bowl 16 rotatable about the axis of symmetry of the tanks 2, and two receiving funnels 17 immoveably mounted beneath the bowl 16.

Figure 3:
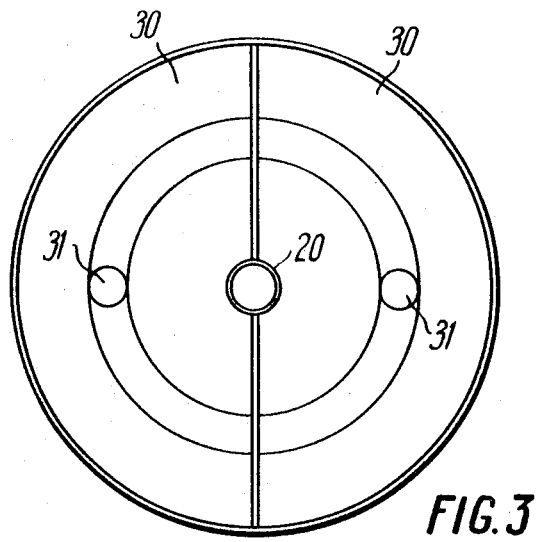
FIG. 3 is a plan view of the receiving funnels.

The bowl 16 is rigidly fixed on the shaft 3 which coincides with the vertical axis of symmetry of the tanks 2. The lower end of the shaft 3 rests on a bearing 18 arranged in the center of the bedplate 1. Serving as the second support for the shaft 3 is a bearing 19 mounted in a bushing 20 (cf., FIG. 3) arranged between the receiving funnels 17.

The bowl 16 is divided by means of a concentric partition 21 into two sections 22 and 23 for pulp and water, respectively.

In the respective bottoms 24 and 25 of the sections 22 and 23 provision is made for openings 26 and 27 adapted for draining the pulp and water, respectively, into the receiving funnels 17.

On the outer wall of the bowl 16 is mounted a pressure means 28 adapted for switching on end switches 29 the moment the pulp is fed to the filtering tanks 2.

The receiving funnels 17 are shaped as half-cylinders whose bottoms 30 (FIG. 3) are provided with openings 31 adapted for draining into the filtering tanks 2 water and pulp supplied to the receiving funnels 17.

The filter separator disclosed in accordance with the present invention operates in the following manner.

Prior to feeding into the bowl 16 (cf., FIGS. 1,2) the pulp in the form of kaolin suspension featuring a low content of contaminating minerals (titanium and iron oxides) is treated with reagents with a view to imparting hydrophobic properties to the minerals (iron and titanium oxides) to be extracted therefrom. The thus prepared pulp is supplied to the section 22, while water is supplied to the section 23 of the bowl 16.

Then, the shaft 3 is rotated together with the bowl 16 immoveably fixed on said shaft.

In the course of rotation of the bowl 16 there takes place in turn change of feed of the pulp and water to the receiving funnels 17, as well as to the filtering tanks 2.

As the opening 26 of the section 22, adapted for draining the pulp, enters the zone of the funnel 17, the pulp starts coming into the filtering tank 2. Concurrently, the pressure means 28 acts to switch on the end switch 29, and direct current is supplied to the electromagnetic coil in this particular filtering tank 2 to magnetize the ferromagnetic filtering elements 15 and the magnet valve 10 which is drawn inside the tank 2 and closes the opening 9 in its bottom 8.

In the course of the passage of the pulp supplied to the tank 2 through the ferromagnetic filtering elements 15, magnetic forces and the forces of selective adherence cause the extraction of the desired minerals (i.e., iron and titanium oxides) from the pulp by adhering to the filtering elements 15.

The moment the electric current passes through the electromagnetic coil 13, the magnet valve 10 is drawn in the opening 9 and the separation of the desired minerals is carried out in bulk.

The pulp purified from admixtures (iron and titanium oxides) enters the space 7 adapted for collecting the processed pulp and is drained through the drain opening 11 into a special receiver (not shown in the drawings).

When the pulp drain opening 26 of the section 22 passes out of the zone of the funnel 17, the water drain opening 27 of the section 23 entering said zone, the pressure means 28 acts to discontinue the supply of electric current and, concurrently, water is supplied to the tank 2. When so doing, there takes place demagnetization of the ferromagnetic filtering elements 15 and the valve 10, the latter moving out of the opening 9 to open the outlet from the tank. Water fed to the tank 2 washes away demagnetized particles of the admixtures (iron and titanium oxides) and passes via the opening 9 opened by means of the magnet valve to the receiver (not shown in the drawings).

Thereupon, the operating cycle of the filter separator of the present invention is repeated. The operation of the other filtering tank 2 is analogous to that of the first one, with the only difference that should the pulp be supplied to the first tank then water is supplied to the second tank.

Presented hereinbelow are:

I. Table of Parameters of the Filter Separator According to the Invention

| No. | Parameter | Value of parameter and units of measurement |
|---|---|---|
| 1. | Specific efficiency of the filter separator per 1 sq.dm of the filter area | 270 kg/hr |
| 2. | Filtration rate | 2.5 cm/sec |
| 3. | Magnetic field intensity | 10,000 to 12,000 oersted |

II. Table of Results of Purifying Kaolins from Impurities by Means of the Filter Separator of the Invention

| Deposits and Concentration Products | content, percent | content, percent | whiteness percent |
|---|---|---|---|
| Kaolin from Glukhovetskii deposit | | | |
| initial | 0.89 | 1.35 | 83 |
| processed | 0.53 | 0.71 | 91 |
| Kaolin from Manuilskii deposit | | | |
| initial | 0.70 | 1.1 | 92 |
| processed | 0.52 | 0.45 | 95 |

What is claimed is:

1. A filter separator for wet enrichment of minerals in finely dispersed materials, said separator comprising: at least two filtering tanks made of a non-magnetic material and disposed about a vertical axis of symmetry, a distributor means for alternate and separate supply of pulp and water into each of said tanks, said distributor means being located above said tanks and supported for turning movement about the vertical axis of symmetry of said tanks, the desired minerals being extracted from the pulp in one of said tanks while the extracted minerals are washed away by water in the other tank; electromagnetic coils arranged in each of said filtering tanks; and ferromagnetic filtering elements disposed in said tanks inside and around said electromagnetic coils to form a closed magnetic core, said coils serving to magnetize said elements.

2. A filter separator as claimed in claim 1, wherein each of the filtering tanks comprises two concentric cylinders separated by a space adapted for collecting the processed pulp, each said tank including a conical bottom portion having an opening in its vertex, and a magnetic valve in said opening for allowing the removal of water with extracted minerals, the outer cylinder including an upper portion which is provided with an opening to discharge the processed pulp.

3. A filter separator as claimed in claim 1, wherein said distributor means comprises a rotatable bowl divided by a concentric partition into two sections for pulp and water, respectively, and two immovable receiving funnels arranged under the bowl, the bottom of each section of the bowl being provided with an opening that is diametrally opposite to the opening in the bottom of the other section to drain pulp and water into said funnels which, upon rotation of the bowl, alternately direct the pulp and water supplied thereinto into the filtering tanks.

4. A filter separator as claimed in claim 1, wherein said ferromagnetic filtering elements are balls or plates.

5. A filter separator for wet enrichment of minerals provided with hydrophobic properties in finely dispersed materials, said separator comprising: at least two filtering tanks made of a non-magnetic material and disposed about a vertical axis of symmetry, a distributor means for alternate and separate supply of pulp and water into each of said tanks, said distributor means being located above said tanks and supported for turning movement about the vertical axis of symmetry of said tanks, the desired minerals being extracted from the pulp in one of said tanks while the extracted minerals are washed away by water in the other tank; electromagnetic coils arranged in each of said filtering tanks; and ferromagnetic filtering elements disposed in said tanks inside and around said electromagnetic coils, said coils serving to magnetize said elements, said filtering elements being coated with a hydrophobic film for promoting the extraction of the minerals.

6. A filter separator as claimed in claim 5, wherein each of the filtering tanks comprises two concentric cylinders separated by a space adapted for collecting the processed pulp, each said tank including a conical bottom portion having an opening in its vertex, and a magnetic valve in said opening for allowing the removal of water with extracted minerals, the outer cylinder including an upper portion which is provided with an opening to discharge the processed pulp.

7. A filter separator as claimed in claim 5, wherein said distributor means comprises a rotatable bowl divided by a concentric partition into two sections for pulp and water, respectively, and two immovable receiving funnels arranged under the bowl, the bottom of each section of the bowl being provided with an opening that is diametrally opposite to the opening in the bottom of the other section to drain pulp and water into said funnels which, upon rotation of the bowl, alternately direct the pulp and water supplied thereinto into the filtering tanks.

8. A filter separator as claimed in claim 5, wherein said ferromagnetic filtering elements are balls or plates.

* * * * *